June 11, 1929.  E. C. TURNER ET AL  1,716,396
SET WORKS
Filed Aug. 15, 1928   2 Sheets-Sheet 2
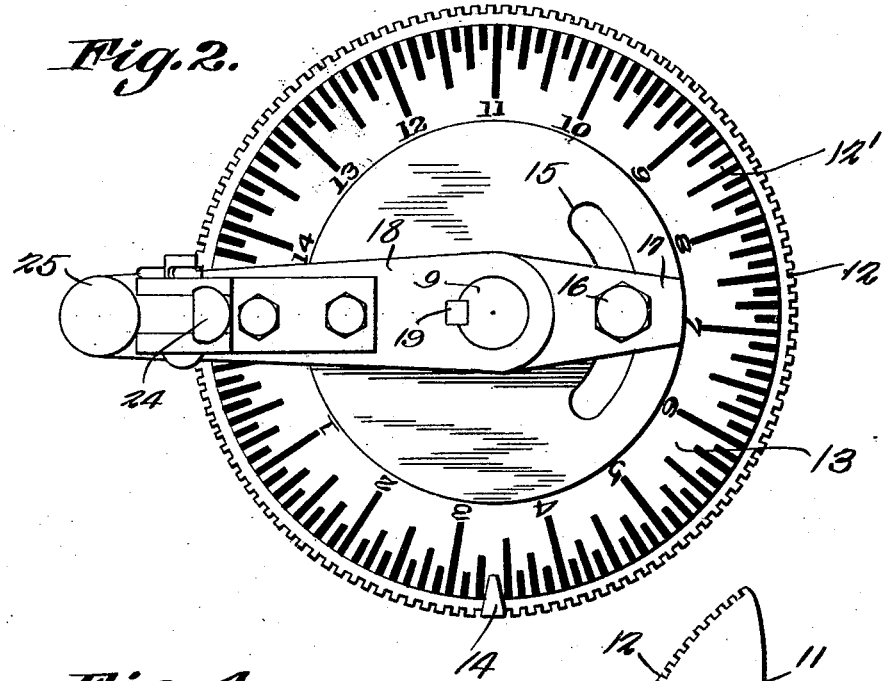
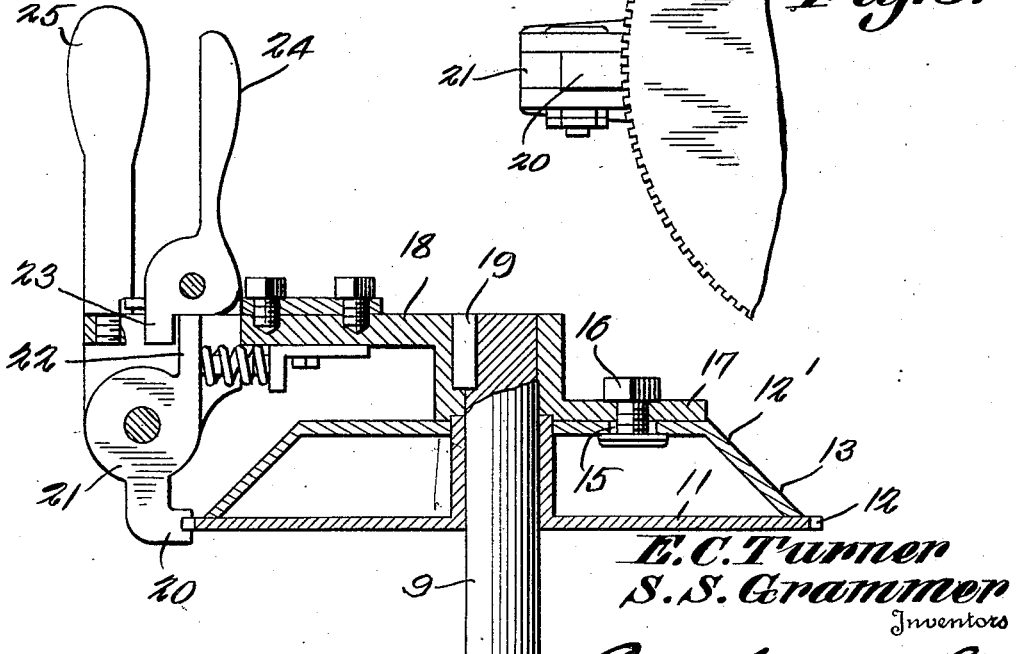
E. C. Turner
S. S. Grammer
Inventors
By C. A. Snow & Co.
Attorneys.

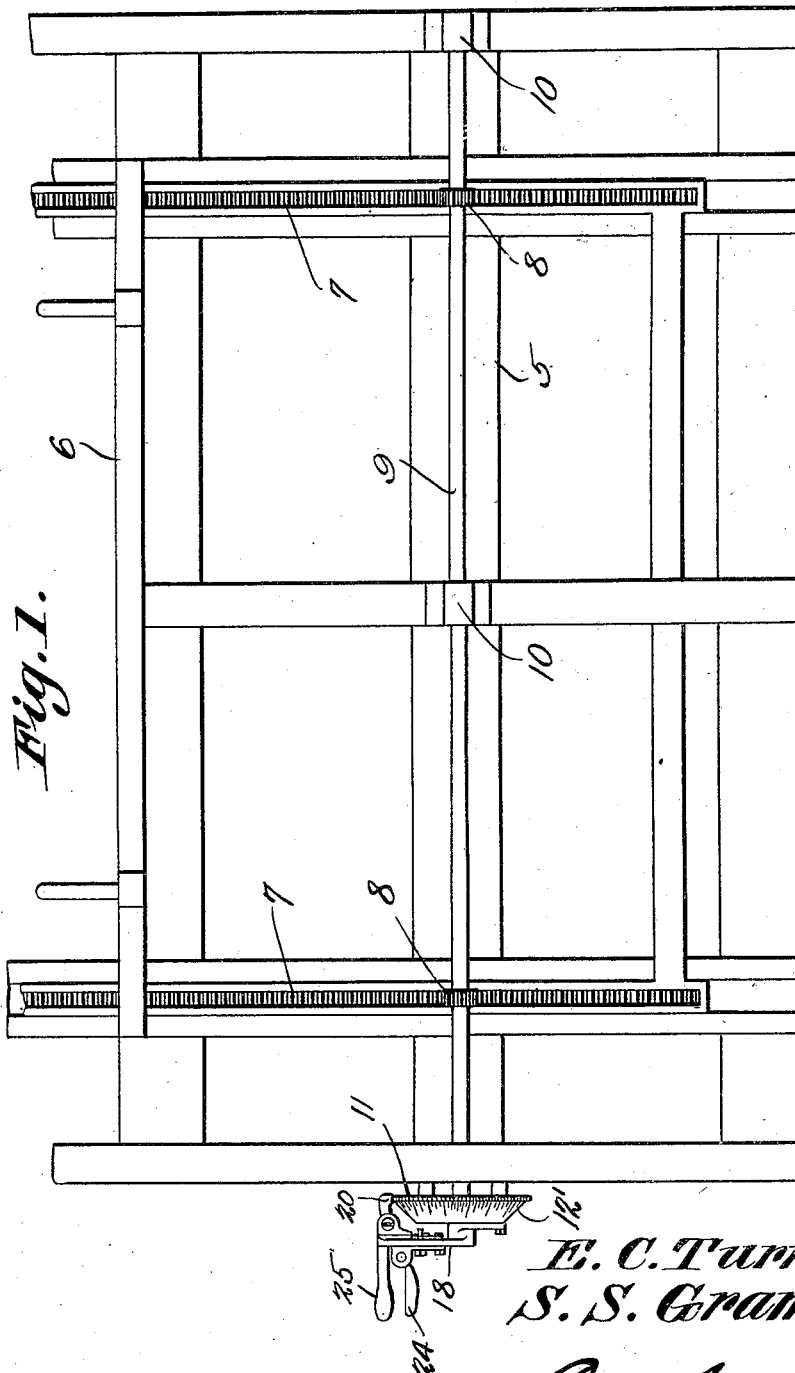

Patented June 11, 1929.

1,716,396

UNITED STATES PATENT OFFICE.

ELISHA C. TURNER AND SEWARD S. GRAMMER, OF WRIGHT CITY, OKLAHOMA.

SET WORKS.

Application filed August 15, 1928. Serial No. 299,788.

This invention has reference to wood sawing machines, and more particularly to the set works thereof, the object of the invention being to provide novel means for insuring a straight and accurate cutting or edging of lumber.

Another important object of the invention is to provide means whereby the operator may readily and easily operate a guiding mechanism to gauge the lumber under operation causing the saw to make a cut of the proper width.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a set works illustrating a device constructed in accordance with the invention, as mounted thereon.

Figure 2 is an elevation view of the gauging device.

Figure 3 is a fragmental bottom plan view thereof.

Figure 4 is a vertical sectional view through the device.

Referring to the drawings in detail, the reference character 5 indicates the frame of a saw mill, or set works on which the movable gauge operates, the gauge being indicated generally by the reference character 6.

The gauge embodies parallel spaced rack bars 7 that move under the pinions 8 mounted on the shaft 9 which in turn is mounted in the bearings 10. The device forming the essence of the invention includes a stationary disk-like member 11 which is provided with teeth 12 disposed in the periphery thereof, for purposes to be hereinafter more fully described.

Operating over the disk is a movable member 12' which has an inclined portion 13 graduated so that the markings thereon may cooperate with the finger 14 carried by the member 11 to permit of an adjustment of the member 13 relative to the stationary member 11, which is secured to the frame 5.

The member 13 is provided with an elongated cut out portion 15 to receive the bolt 16 that also passes through the extension 17 of the handle 18 which is keyed to the shaft 9, by means of the key 19, so that movement of the handle 18 will produce a relative rotary movement of the shaft 9 to cause the pinions 8 to move the rack bars 7 and movable gauge connected therewith, towards or away from the material under operation, to adjust the material with respect to the saw.

As clearly shown by Figure 4, the handle 18 is provided with a cut away portion to accommodate the inwardly extended finger 20 of the latch member 21, which inwardly extended finger is formed with teeth to engage the teeth 12 to hold the member 13 against movement, after it has been properly adjusted, for a particular operation.

An extension 22 forms a part of the latch member 21 and is engaged by the lug 23 of the lever 24 so that as the lever 24 is moved in one direction, the latch member 21 will be moved causing the finger 20 to disengage the teeth of the member 11 to the end that an adjustment of the member 13 and shaft 9 may be made.

A grip 25 also forms a part of the handle 18 and is grasped by the hand of the operator on gripping the member 24, the grip 25 providing means by which the adjustment may be made.

In view of the connection between the handle and member 13, it will be obvious that the initial position of the member 17 with respect to the member 13 may be adjusted to adapt the device for use in connection with various types of work.

We claim:

In combination with the movable guide of a sawing machine and shaft for operating the guide, a gauge embodying a stationary member having teeth in its periphery, and a movable member keyed to the shaft, the movable member cooperating over the stationary member, means for indicating the movement of the movable member with respect to the stationary member, a handle for operating the movable member to rotate the shaft, and means on the handle and engaging the teeth of the stationary member to hold the handle and movable member in its positions of adjustment.

In testimony that we claim the foregoing as our own, we have hereto affixed our signatures.

ELISHA C. TURNER.
SEWARD S. GRAMMER.